(12) United States Patent
Herberger et al.

(10) Patent No.: US 10,424,340 B2
(45) Date of Patent: Sep. 24, 2019

(54) METHOD AND SYSTEM FOR 360 DEGREE VIDEO EDITING WITH LATENCY COMPENSATION

(71) Applicant: BELLEVUE INVESTMENTS GMBH & CO. KGAA, Berlin (DE)

(72) Inventors: Tilman Herberger, Dresden (DE); Titus Tost, Dresden (DE)

(73) Assignee: Bellevue Investments GMBH & Co. KGAA (DE)

( * ) Notice: Subject to any disclaimer, the term of this patent is extended or adjusted under 35 U.S.C. 154(b) by 60 days.

(21) Appl. No.: 15/686,699

(22) Filed: Aug. 25, 2017

(65) Prior Publication Data

US 2018/0061454 A1 Mar. 1, 2018

Related U.S. Application Data

(60) Provisional application No. 62/379,452, filed on Aug. 25, 2016.

(51) Int. Cl.
| | |
|---|---|
| *H04N 5/93* | (2006.01) |
| *G11B 27/031* | (2006.01) |
| *H04N 21/442* | (2011.01) |
| *H04N 21/4363* | (2011.01) |
| *H04N 21/41* | (2011.01) |
| *H04N 13/189* | (2018.01) |
| *H04N 13/194* | (2018.01) |
| *H04N 13/398* | (2018.01) |
| *H04N 21/81* | (2011.01) |
| *G11B 27/00* | (2006.01) |

(52) U.S. Cl.
CPC ......... *G11B 27/031* (2013.01); *H04N 13/189* (2018.05); *H04N 13/194* (2018.05); *H04N 13/398* (2018.05); *H04N 21/4126* (2013.01); *H04N 21/43637* (2013.01); *H04N 21/44245* (2013.01); *H04N 21/816* (2013.01)

(58) Field of Classification Search
CPC .............. H04N 13/194; H04N 13/398; H04N 21/4126; H04N 21/43637; H04N 21/44245; H04N 21/816; H04N 13/189; G11B 27/031
USPC ................................................ 386/278, 230
See application file for complete search history.

(56) References Cited

U.S. PATENT DOCUMENTS 9,544,706 B1 * 1/2017 Hirst ....................... H04S 7/302
10,204,420 B2 * 2/2019 Na ...................... G06F 17/5009
(Continued)

*Primary Examiner* — Helen Shibru
(74) *Attorney, Agent, or Firm* — Crowe & Dunlevy, P.C.; Terry L. Watt

(57) ABSTRACT

There is provided a system and method for latency compensation in a 360° VR video editing system. One embodiment involves a determination of the latency delay between the computer that stores and edits the video and a VR headset worn by the user. This delay might be caused by the need to read, prepare, and wirelessly transmit each video frame to the headset. The determined latency delay is used within the computer to adjust the timeline location of editing commands issued by the user so that they match the timeline locations seen by the user within the headset. This is done so that the user's edit commands are applied within the computer at the same video frame the user was viewing within the VR headset when the command was issued. In some embodiments the display device of the VR headset might be a smart phone.

12 Claims, 2 Drawing Sheets

(56) References Cited

U.S. PATENT DOCUMENTS

| | | | |
|---|---|---|---|
| 2012/0172119 A1* | 7/2012 | Kelly | G07F 17/3211 |
| | | | 463/31 |
| 2016/0027141 A1* | 1/2016 | Patel | G06T 1/20 |
| | | | 345/522 |
| 2016/0330541 A1* | 11/2016 | Miao | H04R 1/1083 |
| 2017/0105053 A1* | 4/2017 | Todd | H04N 21/816 |
| 2017/0374120 A1* | 12/2017 | Vishnia | H04L 65/601 |
| 2018/0176534 A1* | 6/2018 | Herberger | G02B 27/0093 |

* cited by examiner

METHOD AND SYSTEM FOR 360 DEGREE VIDEO EDITING WITH LATENCY COMPENSATION

CROSS REFERENCE TO RELATED APPLICATIONS

This application claims the benefit of U.S. Provisional Patent Application Ser. No. 62/379,452 filed on Aug. 25, 2016, and incorporates said provisional application by reference into this document as if fully set out at this point.

TECHNICAL FIELD

This disclosure relates generally to methods of editing video content and, in more particular, to methods of editing 360 degree and/or VR ("virtual reality") video source material.

BACKGROUND

With the advent of drone aircraft and their ability to carry specialized video cameras that generate 360 degree video material, such material has become more and more widely available. 360° video material (also known as an immersive video or a spherical video) is so-called because the video contains video recordings in all directions about a central point which are recorded at the same time using, e.g., an omnidirectional camera or a collection of individual cameras. This material is usually viewed using virtual reality headsets which, during playback, immerse the viewer in the video and allow him or her to look in any direction that was recorded by the video.

Of course, raw 360° video is not something that users typically want to see. Instead, editing the raw video source material and limiting it to the most interesting scenes is almost universally done. Unfortunately, although easy to use software is widely available for novice uses who want to edit conventional video, editing 360 degree source video material is a completely different undertaking. This is because, first, there is an immense amount of video content that is available for every second of the source material and, additionally and perhaps more importantly, software for editing this material is not provided in an easily accessible and understandable format for the user who might be well versed in standard video editing interfaces.

These realities have led to 360 degree video materials being edited with software that only scratches the surface of the range of video editing functionalities that are available when editing conventional video source material.

Thus, what is needed is a system and method of editing 360 degree video material that provides an intuitive and exact editing process.

Before proceeding to a description of the present invention, however, it should be noted and remembered that the description of the invention which follows, together with accompanying drawings, should not be construed as limiting the invention to the examples (or embodiment) shown and described. This is so because those skilled in the art to which the invention pertains will be able to devise other forms of this invention within the ambit of the appended claims.

SUMMARY OF THE INVENTION

According to an embodiment, there is provided a system and method for editing 360 degree source video material with automatic latency compensation. One embodiment involves the detection of an actively used virtual reality headset in order to automatically provide the functionality of an embodiment to the user of such a headset who is editing the source video material from the "inside" of the material (i.e., while wearing the headset). The user will preferably be provided with an active and continuous wireless connection to a personal computer running the editing software.

The foregoing has outlined in broad terms some of the more important features of the invention disclosed herein so that the detailed description that follows may be more clearly understood, and so that the contribution of the instant inventors to the art may be better appreciated. The instant invention is not limited in its application to the details of the construction and to the arrangements of the components set forth in the following description or illustrated in the drawings. Rather, the invention is capable of other embodiments and of being practiced and carried out in various other ways not specifically enumerated herein. Finally, it should be understood that the phraseology and terminology employed herein are for the purpose of description and should not be regarded as limiting, unless the specification specifically so limits the invention.

BRIEF DESCRIPTION OF THE DRAWINGS

These and further aspects of the invention are described in detail in the following examples and accompanying drawings.

DETAILED DESCRIPTION

Figure 1:
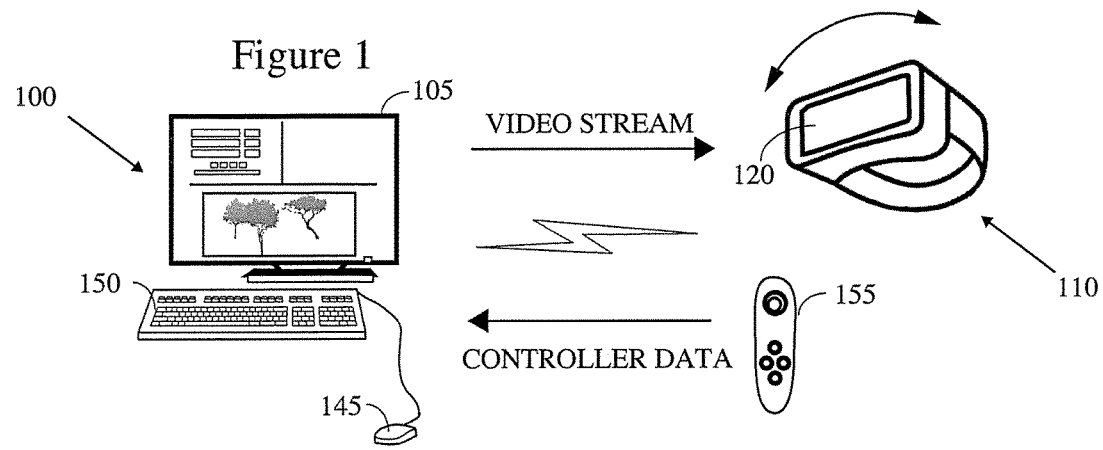
FIG. 1 is an illustration of the working environment of the instant invention.

While this invention is susceptible of embodiments in many different forms, there is shown in the drawings, and will herein be described in detail, some specific embodiments of the instant invention. It should be understood, however, that the present disclosure is to be considered an exemplification of the principles of the invention and is not intended to limit the invention to the specific embodiments or algorithms so described.

Figure 2:
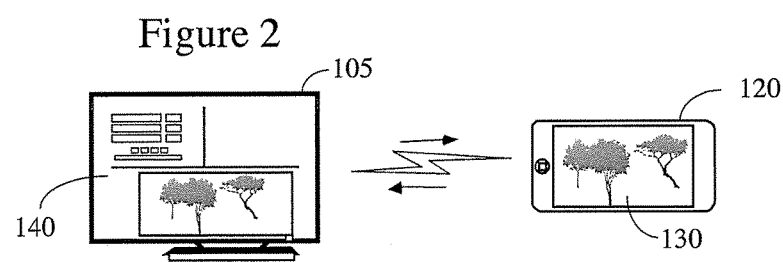
FIG. 2 contains an example of synchronization between a computer display and a VR display device such as a smart phone.

Turning first to FIGS. 1 and 2, an embodiment utilizes a personal computer 100, wherein at least a portion of the instant invention will be implemented in form of software running on that computer. Such a computer will have some amount of program memory and storage (whether internal or accessible via a network) as is conventionally utilized by such units. The work environment of the instant invention consists of that personal computer 100 (e.g., a desktop, laptop, tablet computer, etc., collectively a "computer" hereinafter), it's display device 105 (which might be separate from or integral to the CPU of the computer), and a virtual reality headset 110 that may include a smart phone 120 as its display device. Those of ordinary skill in the art will recognize that a VR video and a 360° or "spherical" video are similar, although not identical, in concept. In both cases, a user wearing a VR headset will be able to view a video as though it was taken around him or her by looking (aiming the headset) in different directions. In the case of VR, though, often the user is able to interact in some way with the virtual environment (e.g., if the user is playing a video game), whereas in a 360° video the user typically is a passive viewer only. In either case, the term 360 degree (or 360°) video will be used herein to refer to any video work which is suitable for display by a VR headset and which was recorded or generated so that it can be viewed in a 360° angle about the user while using the headset.

Note that for purposes of the disclosure that follows and for purposes of specificity, the VR headset may be described as including a smart phone (e.g., an iPhone®) that is used as a display device but that is not a requirement with some embodiments. All that is required is that the headset 110 be in electronic communication with the computer 100, preferably via WiFi, so that video that is resident on the computer can be displayed on the headset 100 via a smart phone display or its own internal display device. So, whether the wireless capability is built into the headset or into the display (if the headset 100 display is a cell phone, MP3 player, etc.) is immaterial to the operation of the instant invention.

Continuing with the present example, the smart phone 120 or other display device will be connected, preferably wirelessly, to the computer 100 either via WiFi that is built into the display 120 of the headset or via a cable connection. Desktop video editing software that is compatible with 360° video will be running on the computer and will access and edit the source material under control of the user. Installed and running on the smart phone or within the headset will be a 360°/virtual reality viewer application (or, equivalently, "app") 130 that allows the user to view the full 360 degrees of the source video by wearing the headset (not shown in FIG. 2) and turning his or her head in any desired direction as is conventional with such headsets.

Further, in some instances the user will have access to a VR-type controller 155 which, in some embodiments, will communicate electronically with the computer 105. The controller 155 might be used to send editing signals to the computer 100 according to methods well known to those of ordinary skill in the art (e.g., via Bluetooth, RF, WiFi, etc.).

The virtual reality viewer app 130 running on the smart phone 120 or within the headset 110 is connected to and synchronized with the video editing software running on the personal computer 100 so that the material that is displayed on the video monitor 105 is simultaneously displayed on the smart phone 120 or other display within the virtual reality headset 110. By utilizing the virtual reality viewer app and the headset 110 according to an embodiment, the user will be able to edit the 360 degree source video material in its entirety from within the worn headset 110, while interacting with the personal computer via well-known interaction devices such as a mouse 145, keyboard 150, touch pad, digitizer, or the previously mentioned VR controller 155 etc.

The personal computer 100 and the VR headset 110 are preferably connected to each other via a wireless technology such as WiFi and, because of this, there will be constant wireless data transfers of video information and controller data between the personal computer 100 and the VR headset 110 while the video is being watched and edited. However, such a connection is not instantaneous—there are transmission delays and latency issues between the time a given video frame is displayed on the computer screen 105 (and/or readied for transmission) and the time the same frame is displayed by the VR display 120. This is for many reasons but key among them is the size of the video frames that are transmitted and the amount of software computation that is required on both devices. For example, determining the current orientation of the VR headset 110 as it applies to the 360° video and extracting the resulting viewable video frame must be done within the computer 110 before transmission to the VR display 120.

Further with respect to the previous example, the video frame that is to be transmitted and displayed must be read (from storage or memory) and encoded/compressed if necessary (e.g., via the chosen codec) on the computer since, in this embodiment, the personal computer will be shouldering the most computationally intensive tasks. One reason for this is that the CPU and software within the VR headset or smart phone display may not have high speed access to the stored video on the computer's hard disk. Additionally, even the 360° video were accessible, the smart phone CPU/VR headset will typically not be able to encode the data in real time before it is transmitted. Of course, if the video is already encoded when it is read, this step would not be necessary. Then, the video frame will have to be transmitted, preferably streamed, to the VR headset, where it will need to be decoded and then displayed on the VR headset display using a virtual reality viewer app running on the smart phone or within the VR headset microprocessor.

If the user of the VR headset is merely observing the video (e.g., watching a playback), latency will not be an issue. The fact that every transmitted frame of the video might be delayed by a second as comparted with what might be seen on locally on the computer display 105 does not impact the user's viewing experience. The fact that the computer might be processing and preparing to send a video frame that is later in time in the video work timeline than the frame that is currently being viewed via the headset 110 is not an issue. However, that amount of delay can be very frustrating if the user is trying to perform precision edits on the video while watching it via the VR headset.

In some cases this delay or latency might be between about 0.3 and 1.0 seconds depending on codec, network speed, connection quality, etc. Of course, this latency can prove to be frustrating to the user who is trying to apply an edit at a specific time point in the video. As such, in some embodiments the exact value of the latency will need to be measured before starting the video editing process. During video editing from within the virtual reality viewer app the measured latency will have to be actively compensated for, otherwise user commands would be placed and executed at the wrong times in the video work when they are implemented by the desktop video editing software.

As an example, if a user uses the controller 155 (or the keyboard 150 or mouse 145) to signal that an edit is to be applied at the frame currently being viewed within the headset 110, the transmission and reception of this command will be near near-instantaneous. Thus, at the time of reception of the controller signal the computer 100 will be processing and transmitting a video frame that is later in the timeline than the one currently being viewed and at which time the edit command is intended to be applied. If the computer were to apply the edit at the then-currently active video frame, the time of the application will be different from the one intended by the user and the amount of time difference will be related to the amount of latency in the system.

The continuous latency compensation is preferably handled within the virtual reality headset 120. While the user is wearing the virtual reality headset the latency compensation functionality can be activated and automatically incorporated into the video editing processes and the associated processes—i.e. controller data transmissions.

To determine if the continuous latency compensation should be activated one embodiment monitors the movement of the smart phone 120 that is embedded in the virtual reality headset 110. In some embodiments, the software will be able to detect if the headset is being worn by sensing changes in the orientation of the headset 110 and activating the latency compensation automatically. However, manual activation at the choice of the user is also a possibility depending on the design of the software 130.

By using a smart phone's 120 accelerometer or similar hardware within the VR headset that is responsive to movement and/or orientation of the headset, even the smallest position and/or orientations changes or movements of the headset 110 can be detected and transmitted to the computer 100 for processing. If the user is wearing the virtual reality headset 110, which might be determined automatically by sensing the presence of such movement/orientation or by selection of a program option by the user, and if the program 130 is active, small angle and position changes will be sensed, quantified, and transmitted to the computer 100 in real time. In some cases, the software 130 within the VR headset will send a signal representative of a "HEADSET ACTIVE" or similar notification to the personal computer editing software 140 if the headset 110 is being worn and, in that event, the latency compensation functionality will be activated. If no position changes, angular movements or other changes are measured, the VR headset will send a signal representative of a "HEADSET PASSIVE" notification to the computer and the latency compensation will not be activated.

In some embodiments, the latency compensation functionality will be a component of the editing processes in either the smart phone 120, the computer 100 or both. That is, an edit command could be adjusted for latency either within the VR headset or the computer. Without latency compensation, as described previously user commands that are initiated based on the view from within the VR headset 110, which commands are received in the computer almost instantaneously, will be implemented later than intended on the computer 100. As suggested previously, the intended edit location could be modified in the VR headset 120 before transmission to the computer or accounted for in the computer after receipt of an edit command.

In an embodiment, the previously determined latency value will define the value of "later"—the edit location which, in the current example, would be between about 0.3 and 1 seconds because of the processing and transmission delay. Assume for purposes of simplicity that the latency is 1 second. As such, if a "STOP" command is initiated by the user in connection with a video work that is 45 seconds into the video as viewed through the headset, the computer 100 would need to adjust the command to correspond to the actual frame perceived by the user when the command was issued. Thus, rather than leave the computer on-screen view/playback head at 46 seconds (the actual frame that was being processed in the computer when the command was received), the known predetermined latency value could be used to adjust the on-screen image to 45 seconds to match the view of the user, if desired. Similarly, the time the edit command was received by the computer 100 will be adjusted so that the edit is actually applied at a time/frame within the video work that corresponds to playback position of the video work as perceived by the user within the VR headset.

User commands that are intended to edit the video work, e.g., cut, paste, start, stop, transition start/end, etc., will need to be adjusted for the predetermined latency value before being applied to the copy of the video work that is resident on the computer if the user's intention is to be accurately reflected.

As another example, if a "cut" command is entered by the user during playback, the actual cut position on the video timeline on the personal computer at the time of receipt would be set at a position later than the user intended unless an adjustment were made. Assuming one second latency, if a "cut" command is issued from the point of view of a user of the VR headset during playback, the cut will be performed by the computer in the video timeline one second earlier than the time of the current playback position. After the "cut" command is issued, typically within the VR headset the display of the video will be immediately stopped and the rest of the transmission buffer (i.e., the buffer containing the video data from the personal computer) will be skipped.

The transmission delay/latency will need to be compensated for in both participating devices if the editing software is in a so called "play mode" when an editing command is issued. That is, when the video is viewed on the VR headset during playback/transmission and the user is entering edit commands with reference to what is being viewed, latency should be accounted for. On the other hand, if the editing software is in "stop mode" (the playback/transmission of the video is stopped) and a static image from the video is displayed, the viewer will show the correct frame in the video work so long as the latency was accounted for when the "STOP" command was issued. In that case, so further active latency compensation will not be needed. In "stop mode" the transmission delay adjustment variable could be set to zero, thereby indicating that the VR head set is in "stop mode". This ensures that the transmission delay compensation is only applied when necessary.

Determining playback, the transmission delay value is preferably carried out automatically and continuously during the editing process. Determination of the latency value might be carried out in many ways according to methods well known to those of ordinary skill in the art. However, and as a specific example, in some embodiments prior to the start of interactive video and data communication between the participating devices (e.g., smart phone and personal computer) blocks of data will be exchanged between these devices until an approximate latency value is determined and it is determined to be sufficiently precise and reliable. Additionally, in some embodiments this process might be continuously monitored during the transmission of the video to adapt that value to period changes that might occur in connection quality. In another embodiment the latency value will be being determined by a calculation taking into account the video compression on the personal computer, the VR display device, and the current WiFi connection between both participating devices. By monitoring the relative timing of the video on the personal computer and the VR headset during playback, the instant invention could continuously determine the current latency value at any time.

In addition to the compensation of the video delay/latency associated with the video stream, the playback of the audio stream of the source video material will also need to be adjusted based on the latency in the system. As before, if audio editing commands are issued from the point of view of a user of the VR headset who is viewing the associated video playback, the playback position of the audio edit in the computer will similarly need to be adjusted for latency. Otherwise the video frames viewed in the virtual reality viewer and the audio stream would be out of sync. If the user is listening to audio material that is stored locally within the VR headset, e.g., in the smart phone display, no delay compensation may be necessary. However, if the audio is being transmitted from the computer in real time, a latency adjustment will likely need to be made. One approach to determining whether or not latency should be taken into consideration might be to provide a software option that allows a user to select whether the audio that is to be played along with the video is to originate on the personal computer or within the VR headset itself, e.g., via a "PC Audio or VR Audio" software flag:

PC Audio: Audio of the source video material is reproduced on the computer and is delayed by the determined transmission delay/latency value.

VR Audio: Audio is only encoded into the VR viewer stream, no delay compensation needed.

The controller data (e.g., FIG. 1) is intended to refer to the data captured from input devices on, or in electronic communication with, the personal computer, for example mouse and keyboard interactions will also need to be adapted according to the determined latency delay value.

Figure 3:
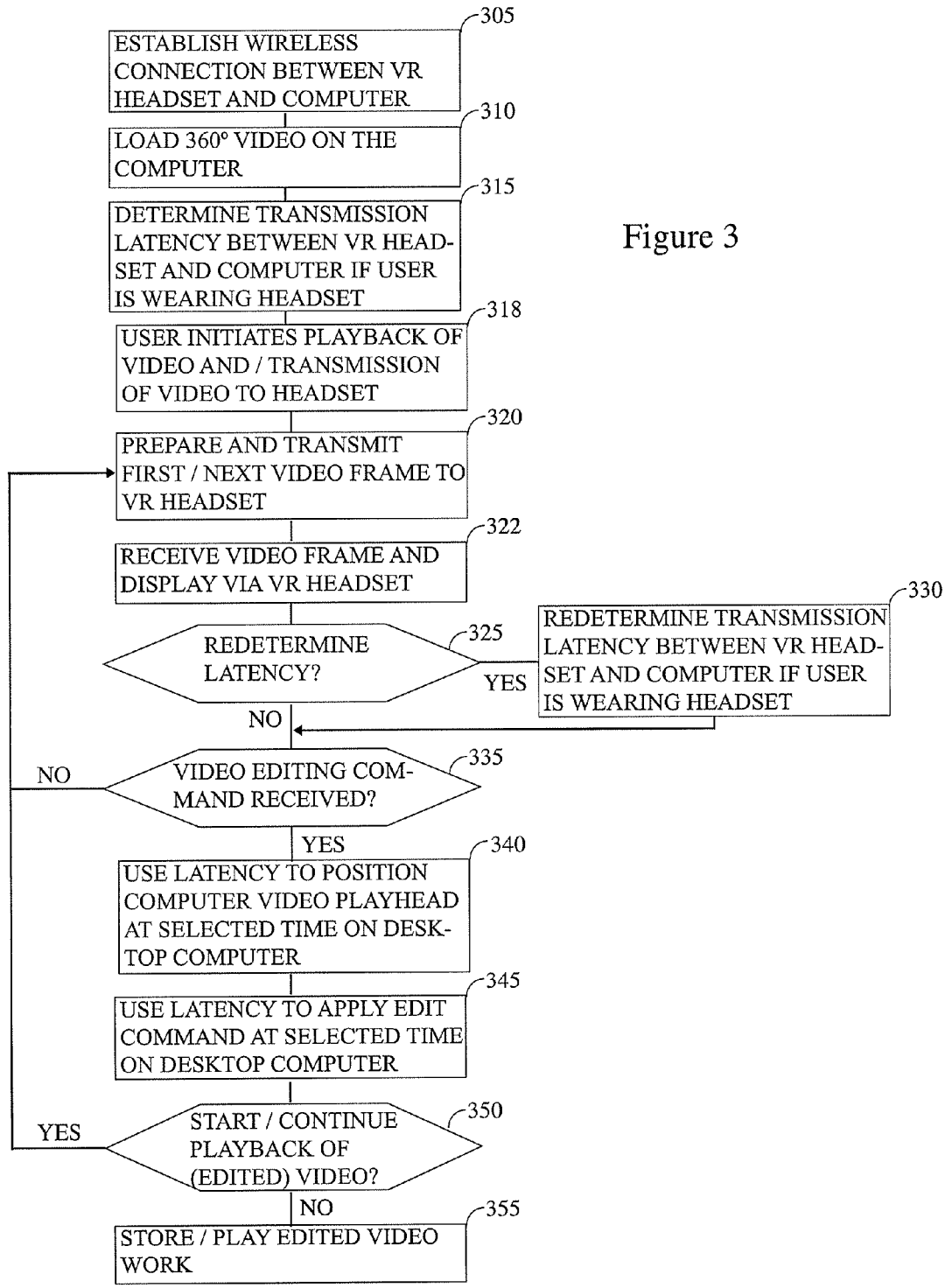
FIG. 3 contains an operating logic suitable for use with an embodiment.

Finally, and turning to FIG. 3 which contains a programming logic suitable for use with an embodiment, as a first step a connection will need to be established between the VR headset and the desktop computer 305. Establishing a WiFi connection would be preferred. Of course, that connection could either be made by a smart phone/viewer or the VR headset itself if it has an integrated display.

The 360° video will need to be loaded onto or accessed by the computer (box 310) so that it can be transmitted to the VR viewer. Additionally, some estimate of the transition latency will need to be determined (box 315) and used as described herein. Although this might be done in many ways, one conventional approach is to transmit blocks of data to the VR headset and then have the VR headset transmit a signal to indicate that the data had been received. To that could be added the amount of time required to read, encode or decode a video frame in the computer, and prepare it for transmission. Those of ordinary skill in the art will readily be able to devise alternative ways of determining latency. The user will initiate playback of the 360° video and transmission of it to the headset (box 318), presumably for purposes of editing it.

Within the computer, the first or next video frame will be accessed, prepared, and transmitted to the user (box 320). The preparation might include accessing the frame (either in memory or on disk) that is to be transmitted and decompressing it and/or decoding it using its codec. It could also involve using sensor information from the headset 110 to prepare the video frame so that it correctly reflects the current orientation of the headset 110 (e.g., including its pitch, yaw, and roll) and gives the proper field of view (e.g., from about 100° to 210° of the 360° depending on the headset). It will then be transmitted to the VR headset wirelessly as discussed previously. That being said, because of the latency issue it might be preferable to extract the proper field of view within the headset.

Within the VR headset, a displayable video frame or a video data block will be received and displayed (box 322) according to methods well known to those of ordinary skill in the art. In some cases the exact image that is displayed will be determined within the VR headset 110 based on its current orientation. That is, if the computer has transmitted the video data block which includes the entire 360° view to the headset 110, the current orientation will be used to extract the proper field of view and display it on the headset display. That being said, whether the extraction of the field of view is done within the VR headset or the computer, either way the process will be described as transmitting a "frame" or a "video frame" from the computer to the headset.

At times it might be useful to redetermine the transmission latency during the performance and the editing process and decision item 325 and box 330 indicate one place within the operating logic where this might be done.

As is further indicated in the example of FIG. 3, a check will be performed to see if a video editing command has been received in the computer from the user (decision item 335) via activation of the keyboard, mouse, VR controller, etc. If not, the video will continue to play for the user (the "NO" branch of decision item 325).

On the other hand, if a video editing command has been received by the computer (the "YES" branch of decision item 325), the current transmission latency will be used to position the computer video playback head/edit point at the selected time (box 340). Note that this implies that the internal edit point within the computer will be located in anticipation of applying the edit. That might also include synchronizing the image that is on the computer display 105 with image currently being viewed by the user within the headset. The on-screen view adjustment is optional but may be useful in many cases. What is most important, though, is that the user's edit be applied within the computer at the correct time point in the video time line. Given the correct location of the edit head in the computer, the user's video edit command will be applied (box 345).

Decision item 350 allows the user to restart or continue the playback of the possibly edited video work by branching back to box 320 (the "YES" branch of decision item 3350) and otherwise to stop the playback and store the edited video work 355.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an addition" element, that does not preclude there being more than one of the additional element.

It is to be understood that where the claims or specification refer to "a" or "an" element, such reference is not be construed that there is only one of that element.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiment, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks.

The term "method" may refer to manners, means, techniques and procedures for accomplishing a given task including, but not limited to, those manners, means, techniques and procedures either known to, or readily developed from known manners, means, techniques and procedures by practitioners of the art to which the invention belongs.

For purposes of the instant disclosure, the term "at least" followed by a number is used herein to denote the start of a range beginning with that number (which may be a range having an upper limit or no upper limit, depending on the variable defined). For example, "at least 1" means 1 or more than 1. The term "at most" followed by a number is used herein to denote the end of a range ending with that number (which may be a range having 1 or 0 as its lower limit, or a range having no lower limit, depending upon the variable being defined). For example, "at most 4" means 4 or less than 4, and "at most 40%" means 40% or less than 40%. Terms of approximation (e.g., "about", substantially", "approximately", etc.) should be interpreted according to their ordinary and customary meanings as used in the associated art unless indicated otherwise. Absent a specific definition and absent ordinary and customary usage in the associated art, such terms should be interpreted to be ±10% of the base value.

When, in this document, a range is given as "(a first number) to (a second number)" or "(a first number)-(a second number)", this means a range whose lower limit is the first number and whose upper limit is the second number. For example, 25 to 100 should be interpreted to mean a range whose lower limit is 25 and whose upper limit is 100. Additionally, it should be noted that where a range is given, every possible subrange or interval within that range is also specifically intended unless the context indicates to the contrary. For example, if the specification indicates a range of 25 to 100 such range is also intended to include subranges such as 26-100, 27-100, etc., 25-99, 25-98, etc., as well as any other possible combination of lower and upper values within the stated range, e.g., 33-47, 60-97, 41-45, 28-96, etc. Note that integer range values have been used in this paragraph for purposes of illustration only and decimal and fractional values (e.g., 46.7-91.3) should also be understood to be intended as possible subrange endpoints unless specifically excluded.

It should be noted that where reference is made herein to a method comprising two or more defined steps, the defined steps can be carried out in any order or simultaneously (except where context excludes that possibility), and the method can also include one or more other steps which are carried out before any of the defined steps, between two of the defined steps, or after all of the defined steps (except where context excludes that possibility).

Further, it should be noted that terms of approximation (e.g., "about", "substantially", "approximately", etc.) are to be interpreted according to their ordinary and customary meanings as used in the associated art unless indicated otherwise herein. Absent a specific definition within this disclosure, and absent ordinary and customary usage in the associated art, such terms should be interpreted to be plus or minus 10% of the base value.

Still further, additional aspects of the instant invention may be found in one or more appendices attached hereto and/or filed herewith, the disclosures of which are incorporated herein by reference as is fully set out at this point.

Thus, the present invention is well adapted to carry out the objects and attain the ends and advantages mentioned above as well as those inherent therein. While the inventive device has been described and illustrated herein by reference to certain preferred embodiments in relation to the drawings attached thereto, various changes and further modifications, apart from those shown or suggested herein, may be made therein by those of ordinary skill in the art, without departing from the spirit of the inventive concept the scope of which is to be determined by the following claims.

What is claimed is:

1. A method of editing a 360° video, comprising the steps of:
   a. using a computer to access the 360° video;
   b. establishing a wireless connection between a VR headset wearable by a user and said computer;
   c. only if said VR headset is being worn by the user, determining a latency delay between said computer and said VR headset;
   d. initiating a playback of said 360° video on said computer;
   e. transmitting said playback of said 360° video to said VR headset;
   f. displaying said playback of said 360° video to a user wearing said VR headset;
   g. allowing the user to issue an edit command at a selected time within said displayed playback of said 360° video within said VR headset;
   h. receiving within the computer said edit command at a reception time within said playback of said 360° video;
   i. using said reception time and said latency delay to determine said selected time within said 360° video;
   j. within said computer, applying said edit command to said 360° video at said selected time within said 360° video, thereby creating an edited 360° video; and
   k. performing at least a part of said edited 360° video for the user.

2. The method of editing a 360° video according to claim 1, wherein step (f) comprises the step of displaying said playback of said transmitted VR video to a user wearing said VR headset using a video display integral to said VR headset.

3. The method of editing a 360° video according to claim 1, wherein step (f) comprises the step of displaying said playback of said transmitted VR video to a user wearing said VR headset using a video display removably attached to said VR headset.

4. The method of editing a 360° video according to claim 3, wherein said video display comprises a smart phone.

5. The method of editing a 360° video according to claim 1, according to step (f) determining if the user is actively wearing said VR headset and utilizing said determined latency delay to determine said selected time.

6. The method of editing a 360° video according to claim 1, wherein step (c) comprises the steps of:
   (c1) determining if said VR headset is being worn by the user by sensing a change in an orientation of said VR headset; and
   (c2) only if said VR headset is worn by the user, determining a latency delay between said computer and said VR headset.

7. A method of editing a 360° video, comprising the steps of:
   a. using a computer to access the 360° video;
   b. establishing a wireless connection between a VR headset and said computer;
   c. determining a latency delay between said computer and said VR headset;
   d. initiating a playback of said 360° video on said computer;
   e. transmitting said playback of said 360° video to said VR headset;
   f. displaying said playback of said transmitted 360° video to a user wearing said VR headset;
   g. allowing the user to issue an edit command at a selected time within said displayed playback of said 360° video within said VR headset;
   h. receiving with the computer said edit command at a reception time within said playback of said 360° video;

i. within said computer, using said reception time and said latency delay to determine said selected time within said 360° video;
j. within said computer, applying said edit command to said 360° video at said selected time within said VR video, thereby creating an edited 360° video; and
k. performing at least a part of said edited 360° video for the user.

8. The method of editing a 360° video according to claim 5, wherein step (f) comprises the step of displaying said playback of said transmitted VR video to a user wearing said VR headset using a video display integral to said VR headset.

9. The method of editing a 360° video according to claim 5, wherein step (f) comprises the step of displaying said playback of said transmitted VR video to a user wearing said VR headset using a video display removably attached to said VR headset.

10. The method of editing a 360° video according to claim 7, wherein said video display comprises a smart phone.

11. The method of editing a 360° video according to claim 5, according to step (f) determining if the user is actively wearing said VR headset and utilizing said determined latency delay to determine said selected time.

12. A method of editing a 360° video, comprising the steps of:
a. using a computer to access the 360° video;
b. establishing a wireless connection between a VR headset wearable by a user and said computer;
c. if said VR headset is being worn by the user, transmitting a signal representative of said VR headset being worn to said computer;
d. only if said signal is received by said computer, determining a latency delay between said computer and said VR headset;
e. if said signal has not been received by said computer, determining that said latency delay is zero;
f. initiating a playback of said 360° video on said computer;
g. transmitting said playback of said 360° video to said VR headset;
h. displaying said playback of said 360° video to a user wearing said VR headset;
i. allowing the user to issue an edit command at a selected time within said displayed playback of said 360° video within said VR headset;
j. receiving within the computer said edit command at a reception time within said playback of said 360° video;
k. using said reception time and said latency delay to determine said selected time within said 360° video;
l. within said computer, applying said edit command to said 360° video at said selected time within said 360° video, thereby creating an edited 360° video; and
m. performing at least a part of said edited 360° video for the user.

\* \* \* \* \*